Figure 1:
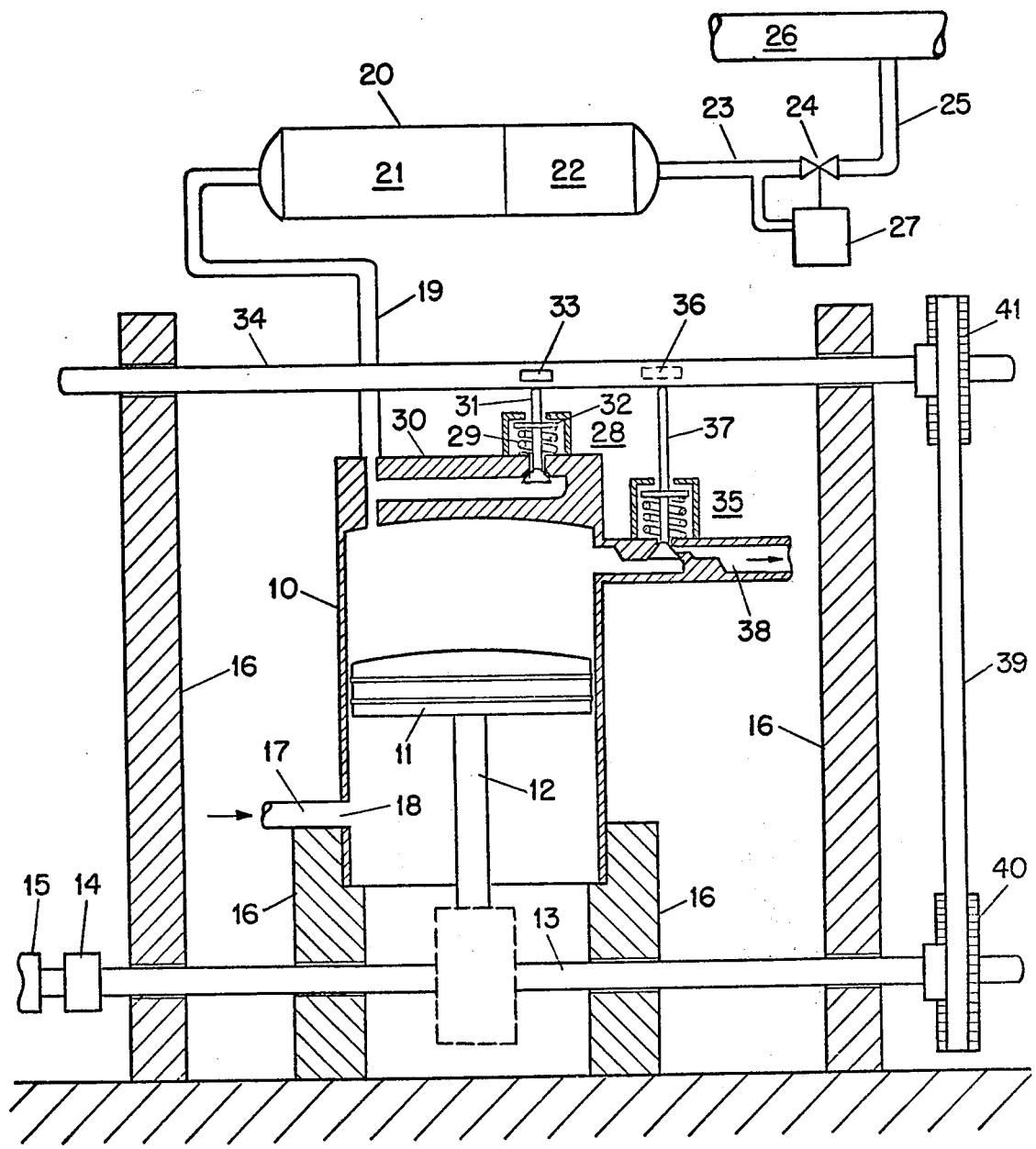

United States Patent [19]

Eriksson

[11] 4,169,715

[45] Oct. 2, 1979

[54] FRACTIONATING APPARATUS

[75] Inventor: Ronny Eriksson, Täby, Sweden

[73] Assignee: AGA Aktiebolag, Lidingo, Sweden

[21] Appl. No.: 821,909

[22] Filed: Aug. 4, 1977

[30] Foreign Application Priority Data

Aug. 13, 1976 [SE] Sweden .................................. 7609060

[51] Int. Cl.² .............................................. B01D 53/04
[52] U.S. Cl. ......................................... 55/161; 55/189; 55/389
[58] Field of Search ........................ 55/58, 62, 75, 189, 55/389, 161

[56] References Cited

U.S. PATENT DOCUMENTS

| 3,121,625 | 2/1964 | Broughton | 55/58 |
| 3,164,454 | 1/1965 | Wilson | 55/58 X |
| 3,182,435 | 5/1965 | Axt | 55/62 X |
| 3,236,028 | 2/1966 | Rutan | 55/62 X |
| 3,280,536 | 10/1966 | Berlin | 55/58 |
| 3,438,178 | 4/1969 | Betteridge et al. | 55/58 |

Primary Examiner—Robert H. Spitzer
Attorney, Agent, or Firm—Larson, Taylor and Hinds

[57] ABSTRACT

This invention relates to apparatus for removing nitrogen from air. A compressor forces the air into a bed which is capable of adsorbing nitrogen from the air and also removes gas from the bed by suction. The cylinder of the compressor communicates directly with the bed through a pipe which permits gas to flow freely in both directions and the bed communicates with the chamber for collecting the gaseous mixture from which the nitrogen has been removed. That chamber is connected to an outlet pump via a first controllable outlet valve while the end of the cylinder which is in direct communication with the bed is provided with a second controllable outlet valve. The nitrogen free mixture passes out through the first controllable outlet valve and the nitrogen passes out through the second outlet valve.

8 Claims, 5 Drawing Figures

FRACTIONATING APPARATUS

The present invention relates to apparatus for fractioning a gaseous mixture having at least two components, using a bed having a molecular sieve or an absorbent capable of adsorbing one of the components under high pressure, said one component being desorbed when the pressure is lowered. When using the apparatus according to the invention, there is obtained a more complete fractionation and thus a higher content of one component or the other in the primary product obtained subsequent to one of the components being adsorbed, or in the secondary product obtained as a result of desorption. The invention is based upon the known expedient of using a cylinder having a reciprocating piston therein and acting as a compressor, by means of which piston a gaseous mixture can be forced into the bed, the pressure on the bed being relieved subsequent to the termination of the compression stroke of the piston and, at the same time, part of the nonadsorbed component, collected in a vessel arranged downstream of the bed, is passed back to the bed.

An apparatus of this type is previously known, for example from FIG. 7 of the U.S. Pat. No. 3,280,536. This known apparatus, however, is encumbered with a number of disadvantages, one of which is that the yield of non-adsorbed component in a gaseous mixture charged to the apparatus is unsatisfactorily low, and that the useful life of the valves in the apparatus is far too short.

These disadvantages are eliminated by means of the present invention, which is characterised by the features disclosed in the accompanying claims. The invention will now be described with reference to the accompanying drawings, which illustrate an embodiment of an apparatus constructed in accordance with the invention.

FIG. 1 shows schematically the different elements of the apparatus, while FIGS. 2, 3, 4 and 5 illustrate elements of the apparatus in different phases of operation.

The apparatus illustrated in the FIGURES may, in principle, be used to fractionate any type of gaseous mixture. In the illustrated example, however, it is assumed that the apparatus is used to manufacture relatively pure oxygen gas from air supplied to the apparatus. As will be seen from FIG. 1, the apparatus comprises a cylinder 10 in which a piston 11 is reciprocatingly movable, said piston being provided in a known manner with piston rings. The piston 11 is mounted on a connecting rod 12 driven by a crank shaft 13. The crank shaft 13 is driven by an electric motor 15 via a gear means 14. The electric motor and the gear means 14 are suitably so dimensioned that the crank shaft 13 rotates at a speed of from 0.1–10 revolutions per minute. The crank shaft 13 is assumed to be mounted on a frame 16, as indicated in the FIGURE.

The gaseous mixture to be fractioned, air in the illustrated embodiment, is introduced into the cylinder through an inlet 17 which terminates with an opening 18 in the cylinder 18. The inlet 17 is suitably arranged in the lower portion of the cylinder 10. The upper portion of the cylinder communicates with a vessel 20 through a line 19. Approximately three quarters of the vessel 20 of the illustrated embodiment is occupied by a bed 21 having a crystallised, zeolitic molecular sieve capable of selectively adsorbing nitrogen. The remainder of the vessel 20, referenced 22 in the drawing, is assumed to be empty. This portion of the vessel 20 is connected to an outlet line 25 through a line 23 having a pressure-controlled valve 24 arranged therein, the outlet line 25 passing to a collecting line 26 for the non-adsorbed component of the gaseous mixture. Outlet lines corresponding to the outlet line 25 and being associated with corresponding apparatus may be connected to the collecting line 26, said corresponding apparatus being constructed in the same manner as that illustrated in FIG. 1. The valve 24 may be controlled by a pressure-controlled element 27 arranged to sense the pressure in the line 23 from the vessel 20.

Arranged at the same end of the cylinder 10 from which the line 19 extends there is arranged a first outlet valve 28. This valve has the form of a plate-valve and is held closed by a spring 29 arranged between the cylinder wall 30 and an abutment surface 32 arranged on a push-rod 31.

The push-rod 31 carries the valve body and is actuated to open the valve by a cam 33 on a cam shaft 34. The outlet valve 28 passes directly to the surroundings and is primarily intended to serve as an outlet for the gas component released by the aforementioned desorption process.

A second outlet valve 35 is arranged at the same end of the cylinder 10 as the outlet valve 28. The valve 35 is also held in its closed position by a spring, and can be opened by means of a further cam 36 on the cam shaft 34, this further cam being arranged to actuate a push-rod 37 associated with the valve body in the valve 35. The gas passing through the valve 35 is conducted away through an evacuation passage 38.

The cam shaft 34 is driven by means of a belt or a chain 39 passing over a drive pulley 40 on the crank shaft 13 and a further drive pulley 41 on the cam shaft 34. In this way synchronisation between the movements of the piston 11 and the valves 28 and 35 is ensured in a simple and reliable manner.

Figure 2:
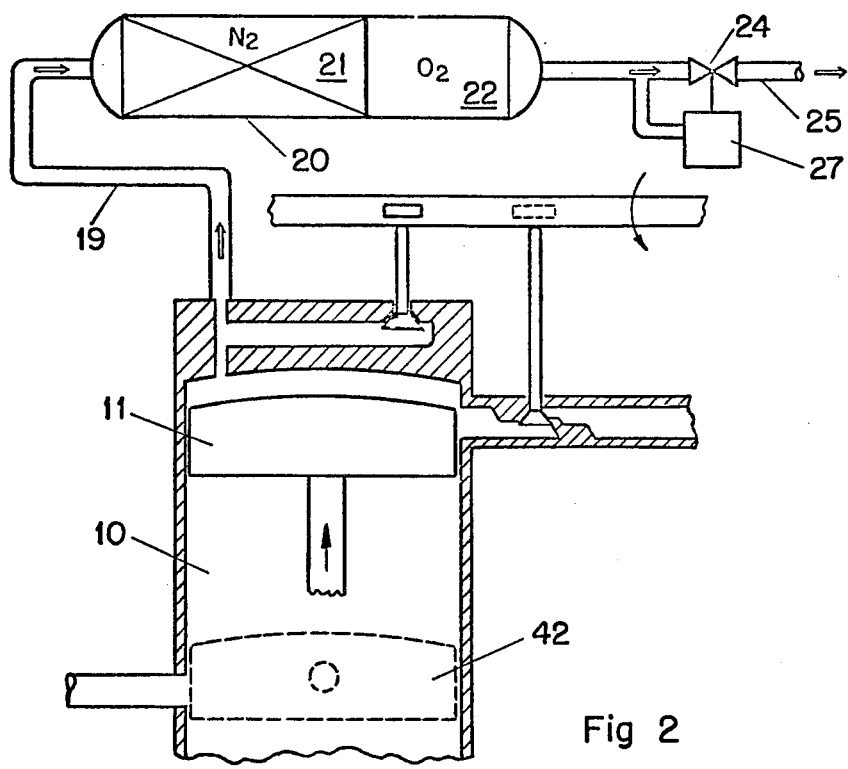
Figure 3:
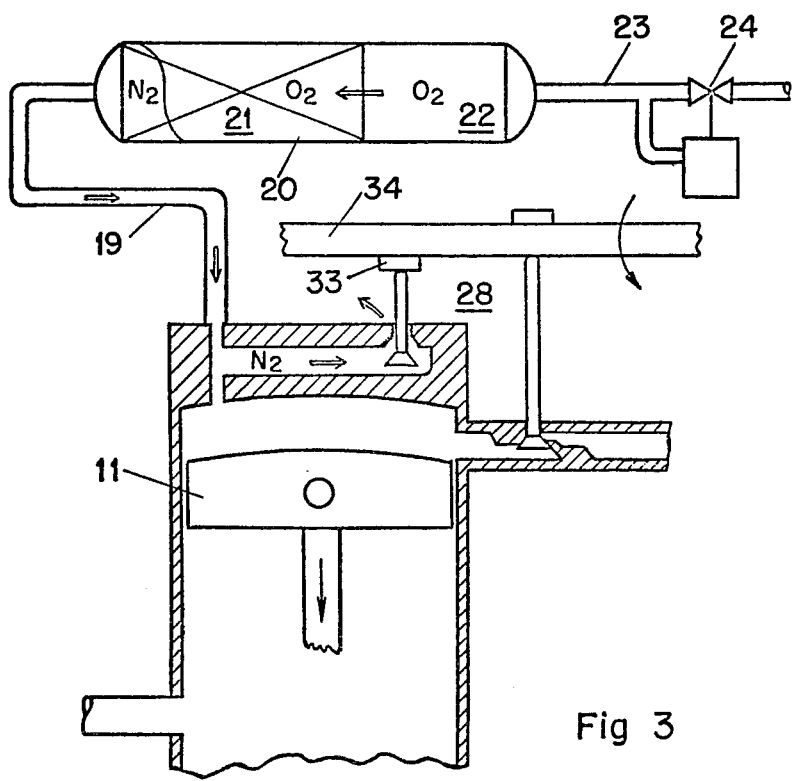
Figure 4:
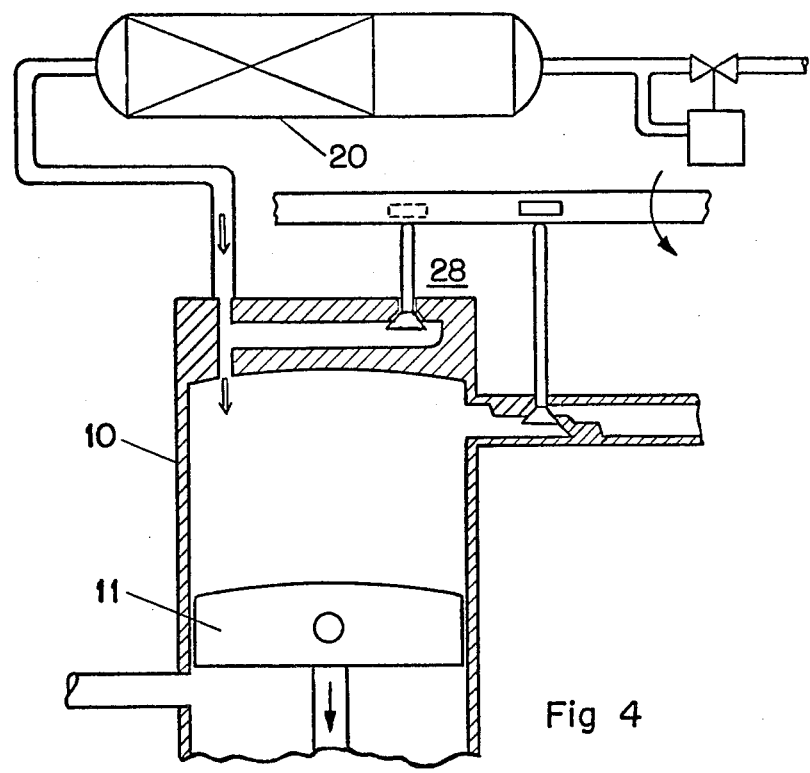
Figure 5:
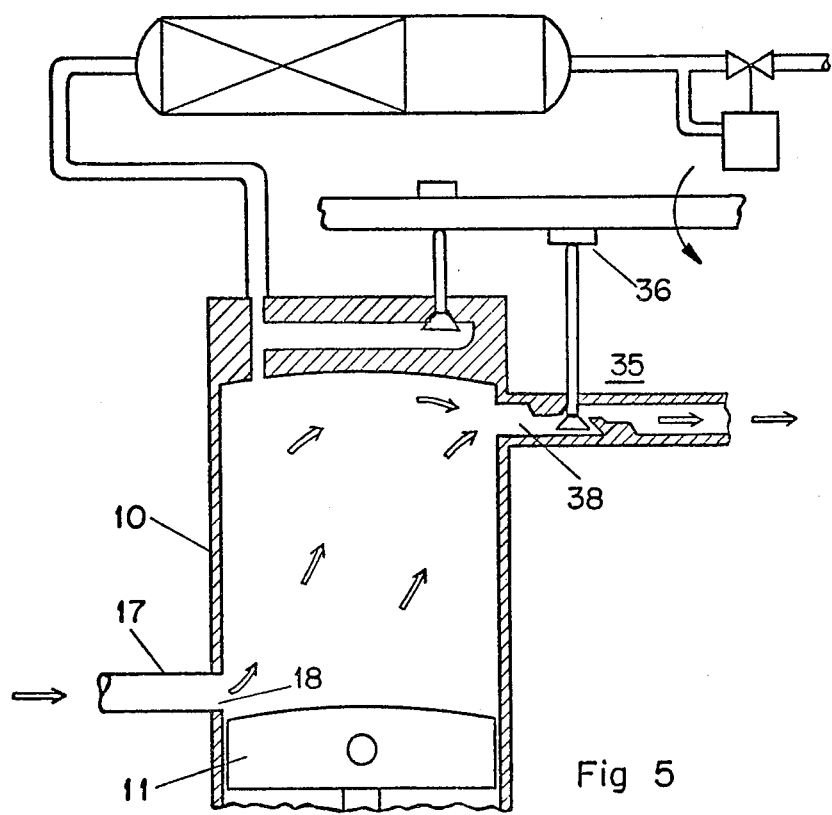

The mode of operation of the apparatus will now be described with reference to the FIGS. 2–5, of which FIG. 2 shows the apparatus when the piston 11 moves towards one limit position, hereinafter referred to as the top-dead-centre position, the piston in FIG. 2 being shown in the proximity of this top-dead-centre position. FIG. 3 shows the apparatus when the piston 11 has just left the top-dead-centre position and begins to move towards the other limit position, hereinafter referred to as the bottom-dead-centre position. FIG. 4 shows the apparatus when the piston 11 approaches the inlet opening 18. FIG. 5 shows the apparatus when the piston 11 occupies the bottom-dead-centre position.

When the piston 11 moves upwardly in the cylinder 10 from the position indicated by dash-lines 42 in FIG. 2, both the inlet opening 18 and the valves 28 and 35 are closed. As the piston rises, the gas enclosed in the cylinder is forced under compression through the line 19 and into the vessel 20. The pressure in the vessel increases until a predetermined pressure above atmospheric is reached in the vesssel 20, for example a pressure of 0.3 MPa. When this predetermined pressure is reached, the pressure-sensing element 27 will operate to open the outlet valve 24. Nitrogen present in the gas in the vessel 20 will be adsorbed at the high pressure prevailing in the bed 21, so that a gaseous mixture having a high content of oxygen will be passed to the chamber 22 and from there to the line 25.

As the piston 11 moves downwards, subsequent to having reached its top-dead-centre position, as shown in FIG. 3, the pressure in the vessel 20 will drop, and therewith also the pressure in the lines 23, whereupon the valve 24 is closed. At the same time, the cam 33 causes the outlet valve 28 to open. Compressed gas present in the chamber 22 and having a high content of the non-adsorbed oxygen will then penetrate the bed 21 and contribute to cleansing the same from adsorbed nitrogen gas, which gas then passes to the surroundings through the line 19 and valve 28. Subsequent to decreasing the pressure in the vessel 20 to normal atmospheric pressure, the valve 28 is closed, at the same time as the piston 11 moves further downwardly in the cylinder 10, as shown in FIG. 4. In this way a partial vacuum is created in the cylinder 10, and therewith also in the vessel 20, thus contributing further to the release of the adsorbed component of the gas.

As the piston 11 moves downwardly, the piston will pass the opening 18 as shown in FIG. 5, enabling air to be supplied through the line 17, for example by means of a fan. Simultaneously herewith, the outlet valve 35 is opened by the cam 36, the inflowing air filling the cylinder 10 and also blowing residual nitrogen gas, released by the aforementioned desorption process, through the line 38. As a result hereof no residual nitrogen is present in the cylinder when the piston 11 begins again to move upwardly therein, but that the cylinder is filled with pure air. The aforementioned sequence of events is then repeated periodically.

Because the cylinder 10 with the piston 11 arranged for reciprocating movement therein, operates during a portion of its work as a compressor, and during another portion of its work creates a partial vacuum in the vessel 20 having the bed 21 arranged therein, the component of the gaseous mixture adsorbed in the bed is desorbed therefrom in a manner not previously possible. This means that the non-adsorbed component departing through the collecting line 26 is far purer than was previously possible. Further, the two outlet valves 28 and 35 have the form of spring-biased plate valves, thereby greatly lengthening the useful life of the valves.

I claim:

1. Apparatus for fractionating a gaseous mixture having at least two components comprising:
   a vessel containing a bed having an adsorbent capable of adsorbing one of said at least two components under high pressure and of desorbing said one component when the pressure is decreased;
   a compressor comprising a cylinder having a reciprocatingly moveable piston mounted therein for alternately moving towards a first, compression, limit position for forcing a gaseous mixture into the bed and a second, suction, limit position for removing gas from the bed by suction, and means for admitting a gaseous mixture into said cylinder at a location between said first and second limit positions;
   conduit means for conveying compressed gas from said compressor to said bed;
   a collection chamber in fluid communication with said vessel for collecting gas which passes from said compressor through said bed and into said collection chamber;
   outlet means comprising a controllable outlet valve for removal of gas from said collection chamber; and
   controllable venting valve means in fluid communication with compressed air in the end of the cylinder adjacent said first limit position of said piston for venting gas under pressure from said collection chamber and bed through the conduit means when said piston is in said first limit position and said controllable venting valve means is opened.

2. Apparatus according to claim 1 further comprising control means responsive to pressure in said collection chamber for opening said outlet valve at a pre-determined elevated pressure and for closing said controllable outlet valve when the pressure falls below a predetermined level.

3. Apparatus according to claim 1 further comprising control means for opening said venting valve means when said piston is positioned at said end of said cylinder to decrease the pressure in said bed to effect desorption and to blow out the component of the gaseous mixture released by desorption.

4. Apparatus according to claim 3 further comprising a further controllable venting valve means in fluid communication with a portion of said cylinder between said first limit position and said gaseous mixture admitting means, control means for opening said further venting valve means as said piston moves towards said first limit position.

5. Apparatus according to claim 4 wherein said controllable venting valve means each comprise plate valves actuated through push rods by cams mounted on a cam shaft.

6. Apparatus according to claim 5 wherein said piston and said cam shaft are driven by a crank shaft.

7. Apparatus according to claim 6 further comprising means for driving said crank shaft at a speed of 0.1 to 10 r.p.m.

8. Apparatus according to claim 1 wherein said collection chamber comprises a portion of said vessel, the volume of said collection chamber being approximately one third of the volume of said bed.

* * * * *